(12) United States Patent
Pan et al.

(10) Patent No.: US 7,035,501 B2
(45) Date of Patent: Apr. 25, 2006

(54) CHOLESTERIC LIQUID CRYSTAL CELL DEVICES AND SYSTEMS

(75) Inventors: Jing-Jong Pan, Milpitas, CA (US); Hai-Ming Wu, Milpitas, CA (US)

(73) Assignee: Lightwaves 2020, Inc., Milpitas, CA (US)

( * ) Notice: Subject to any disclaimer, the term of this patent is extended or adjusted under 35 U.S.C. 154(b) by 87 days.

(21) Appl. No.: 10/809,253

(22) Filed: Mar. 25, 2004

(65) Prior Publication Data

US 2004/0228571 A1 Nov. 18, 2004

Related U.S. Application Data

(62) Division of application No. 10/005,890, filed on Dec. 5, 2001, now Pat. No. 6,834,137.

(51) Int. Cl.
*G02B 6/42* (2006.01)

(52) U.S. Cl. .............................. 385/17; 385/16; 385/18; 349/196

(58) Field of Classification Search .................. 385/16, 385/17, 18; 349/115, 196, 197
See application file for complete search history.

(56) References Cited

U.S. PATENT DOCUMENTS

| 4,991,924 | A | 2/1991 | Shankar et al. ............. 349/196 |
| 5,276,747 | A | 1/1994 | Pan et al. ..................... 385/34 |
| 5,706,371 | A | 1/1998 | Pan | |
| 5,742,712 | A | 4/1998 | Pan et al. ..................... 385/18 |
| 6,181,846 | B1 | 1/2001 | Pan .............................. 385/18 |
| 6,249,625 | B1 | 6/2001 | Pan .............................. 385/43 |
| 6,256,448 | B1 * | 7/2001 | Shahid ....................... 385/147 |
| 6,330,380 | B1 * | 12/2001 | Young et al. ................. 385/17 |
| 6,680,758 | B1 * | 1/2004 | Faris ............................. 349/1 |
| 6,798,938 | B1 * | 9/2004 | Cao ............................. 385/17 |

* cited by examiner

*Primary Examiner*—Dung T. Nguyen
*Assistant Examiner*—Michael H Caley
(74) *Attorney, Agent, or Firm*—Aka Chan LLP

(57) ABSTRACT

Cholesteric liquid crystal cell units are used for reflecting or transmitting incident light responsive to control signals. A cholesteric liquid crystal cell unit has a first cholesteric liquid crystal cell and a second cholesteric liquid crystal cell. The second cholesteric liquid crystal cell respectively reflects or transmit lights from the first cholesteric liquid crystal cell responsive to a control signal when the first cholesteric liquid crystal cell reflects circularly polarized light of one state or transmits the incident light. In one embodiment of the cell unit, a π-phase waveplate element is located between the first and second cholesteric liquid crystal cells. With the cholesteric liquid crystal cell units, devices such as optical switches, and WDM add/drop multiplexers, and optical switch systems with arrays of input and output optical fibers between a switching matrix formed by the cholesteric liquid crystal cell units, may be constructed.

23 Claims, 10 Drawing Sheets

CHOLESTERIC LIQUID CRYSTAL CELL DEVICES AND SYSTEMS

CROSS-REFERENCE TO RELATED APPLICATION

This application is a division of U.S. patent application Ser. No. 10/005,890 filed Dec. 5, 2001 now U.S. Pat. No. 6,834,137 which is incorporated by reference in its entirety for all purposes.

BACKGROUND OF THE INVENTION

The present invention is related to fiberoptic network devices and systems, and in particular, to cholesteric liquid crystal cell devices and switch systems.

In fiberoptic networks light signals are used to carry information over optical fibers. Different techniques are used to control optical signals from the sender to the receiver. For example, time slots (time division multiplexing) or wavelengths (wavelength division multiplexing) may be used to define communication channels over an optical fiber. To carry out these operations, fiberoptic networks use many devices and systems of varying complexity. But speed has always been a prime objective in network operations. Hence one goal has been the creation of all-optical fiberoptic networks. Rather than converting incoming optical signals to electrical signals which are then processed by the network device or system and then reconverted back to outgoing optical signals, an all-optical network maintains the communication signals as optical signals as they pass through the network devices and systems. In this manner, the network loses no conversion time.

One promising technology toward this goal has been microelectromechanical system (MEMS) switches. Though there are many variations, the basic operation of a MEMS switch is the direction of light beams from an array of input optical fibers into an array of output optical fibers by an array of mirrors which selectively direct the incoming light beams to the arrayed ends of the output optical fibers. The position of each mirror is controlled by the selective application of deflection voltages. As the name implies, the mirrors in MEMS switches are also very small to provide the theoretical advantages of higher operational speeds due to the small inertial mass of the mirrors, lowered manufacturing costs from semiconductor processing circuit technology used to manufacture the mirror array with lower unit costs, and ease of installation and maintenance from the presumed small size of the MEMS switch. However, these advantages have not been realized thus far. Reliability, a prime concern for all networks, has reportedly been a problem with MEMS switches. Apparently the mechanical properties of these systems, the stress and strain on the mirrors (or their supports), add to the complexity of the systems and detract from their reliability.

To avoid these problems, the present invention utilizes cholesteric liquid crystal cells which form network devices and systems without the mechanical disadvantages of a MEMS and other optomechanical systems. Furthermore, the network devices and systems of the present invention retain the advantages of small size described above.

SUMMARY OF THE INVENTION

The present invention provides for a cholesteric liquid crystal cell unit for receiving incident light. The unit has a first cholesteric liquid crystal cell which receives the incident light and which reflects circularly polarized light of one state of the incident light or transmits the incident light, responsive to a control signal. The unit also has a second cholesteric liquid crystal cell arranged with respect to the first cholesteric liquid crystal cell to receive the light transmitted by the first cholesteric liquid crystal cell. The second cholesteric liquid crystal cell is selected to reflect or transmit light from the first cholesteric liquid crystal cell responsive to the control signal when the first cholesteric liquid crystal cell reflects the circularly polarized light of the one state or transmits the incident light respectively. In one embodiment of the cell unit, a π-phase waveplate element is located between the first and second cholesteric liquid crystal cells.

The present invention also provides for an optical switch device which has a first sleeve holding first and second optical fibers fixed in a central longitudinal channel, a first collimating GRIN lens proximate an end face of the first sleeve, a second sleeve holding a third optical fiber in a central longitudinal channel, and a second collimating GRIN lens proximate an end face of the second sleeve. The two GRIN lenses face each other with a cholesteric liquid crystal cell unit as described above. The first and second sleeves, the first and second GRIN lenses, the cholesteric liquid crystal cell unit are arranged and oriented with respect to each other so that light from the first optical fiber passes through, and back from, the first collimating GRIN lens, and the cholesteric liquid crystal cell unit into the second optical fiber when the cholesteric liquid crystal cell unit reflects light responsive to the control signal, and light from the first optical fiber passes through the first collimating GRIN lens, the cholesteric liquid crystal cell unit, and the second collimating GRIN lens into the third optical fiber when the cholesteric liquid crystal cell units transmits light responsive to the control signal. With the cholesteric liquid crystal cell unit reflecting light responsive to a first control signal voltage and transmitting light responsive to a second control signal voltage, the device can be operated as an attenuator by using control signal voltages intermediate the first and second control signal voltages so that the cholesteric liquid crystal cell unit proportionally transmits and reflects light.

The present invention provides for an WDM add/drop multiplexer device which has a first sleeve, a network input optical fiber and a network output optical fiber fixed in a first sleeve channel, a first collimating GRIN lens proximate the first sleeve, a second sleeve, an add optical fiber and a drop optical fiber fixed in a second sleeve channel, and a second collimating GRIN lens proximate the second sleeve. The first and second collimating GRIN lenses are directed toward each other with a wavelength-dependent filter proximate the first collimating GRIN lens. The wavelength-dependent filter transmits light at selected wavelengths and reflects light at other wavelengths. A cholesteric liquid crystal cell unit lies between the wavelength-dependent filter and the second end face of the second GRIN lens. The first and second sleeves, the first and second GRIN lenses, the wavelength-dependent filter, and the cholesteric liquid crystal cell unit are arranged and oriented with respect to each other so that light from the network input optical fiber at the other wavelengths passes through, and back from, the first collimating GRIN lens and the wavelength-dependent filter into the network output optical fiber, and so that light from the network input optical fiber at the selected wavelengths passes through, and back from, the first collimating GRIN lens, the wavelength-dependent filter, and the cholesteric liquid crystal cell unit into the network output optical fiber when the cholesteric liquid crystal cell units reflects light responsive to the control signal, and so that light from the first optical fiber at the selected wavelengths passes through the first collimating GRIN lens, the cholesteric liquid crystal cell unit, and the second collimating GRIN lens into the drop optical fiber when the cholesteric liquid crystal cell units transmits light responsive to the control signal. Light from the add optical fiber at the selected wavelengths passes through the second collimating GRIN lens, the cholesteric liquid crystal cell unit, the wavelength-dependent filter and the second collimating GRIN lens into the network output optical fiber when the cholesteric liquid crystal cell units transmits light responsive to the control signal.

The present invention also provides for an optical switch system which has an array of input optical fibers, an array of first output optical fibers, an array of second output optical fibers, and a switching matrix of cholesteric liquid crystal cell units. Each liquid crystal cell unit reflects or transmits light selectively responsive to control signals and is arranged with respect to the array of input optical fibers, the array of first output optical fibers and the array of second output optical fibers so that light signals from an input optical fiber may be selectively reflected into one of the first output optical fibers or transmitted into one of the second output optical fibers. The array of input optical fibers, the array of first output optical fibers and the array of second output optical fibers are arranged in two-dimensional arrays, and the switching matrix of cholesteric liquid crystal cell units in a three-dimensional array. Alternatively, the optical switch system might have only one array of output fibers so that light signals from an input optical fiber may be selectively reflected (or transmitted) by a liquid crystal cell unit into one of the output optical fibers and light which is selectively transmitted (or reflected) is lost or received by a monitoring optical fiber.

DESCRIPTION OF THE SPECIFIC EMBODIMENTS

Liquid crystal cells are commonly used in electronic displays, such as those found in electronic watches or portable computers. The liquid crystals in such displays are typically nematic or smectic liquid crystals. In the present invention, the cholesteric liquid crystals are used. These liquid crystal cells act upon light in circularly polarized states and it should be understood that any polarized light can be resolved into two circularly polarized component states, i.e., left-handed and right-handed states. A cholesteric liquid crystal cell strongly reflects light of one circularly polarized state, say, left-handed circularly polarized (LHCP) light, and transmits light in the other circularly polarized state, in this example, right-handed circularly polarized (RHCP) light. With a control signal creating an electric field of suitable strength and direction, the orientation of the cholesteric liquid crystal in the cell can be affected so that light of any polarization state is transmitted through the cell.

In accordance with the present invention, cholesteric liquid crystal cells are assembled into units to create fiberoptic network devices and systems, as described below.

Cholesteric Liquid Crystal Cell Unit

Figure 1:
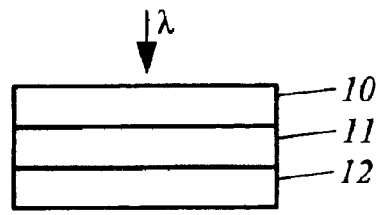
FIG. 1 is a general diagram of a cholesteric liquid crystal cell unit in accordance with the present invention.

FIG. 1 illustrates the general organization of a cholesteric liquid crystal cell unit, which has two cholesteric liquid crystal cells 10 and 12, and π-phase waveplate element 11. Each cholesteric liquid crystal cell 10 and 12 blocks light in one circularly polarized state, LHCP, for example, while transmitting light in the other circularly polarized state (RHCP). If a sufficiently large voltage is impressed upon a cell, then light in both polarization states is transmitted through the cell.

The π-phase waveplate element 11 is fixed between the two cells 10 and 12, and can be formed from a plate of birefringent material, such as quartz, lithium niobate, calcite or rutile. Alternatively, the waveplate element 11 can be a third liquid crystal cell with a birefringent liquid crystal, such as nematic or smectic material. The thickness of the plate or cell thickness is such that the phase of the incident light is retarded by π. In other words, both the solid plate and the liquid crystal cell 11 operate as a π-phase waveplate.

Figure 2A:
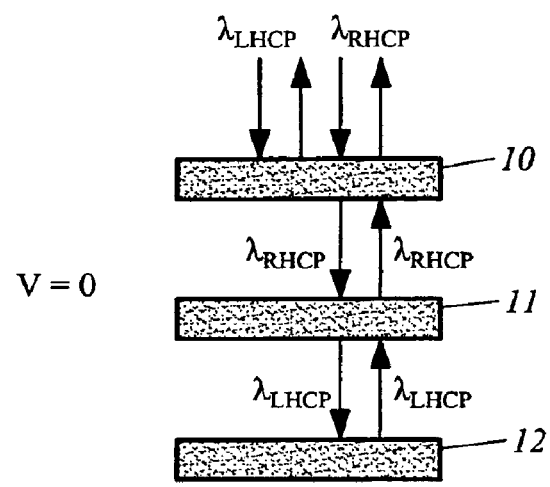
FIG. 2A illustrates the operation of the FIG. 1 cholesteric liquid crystal cell unit with one control signal.
Figure 2B:
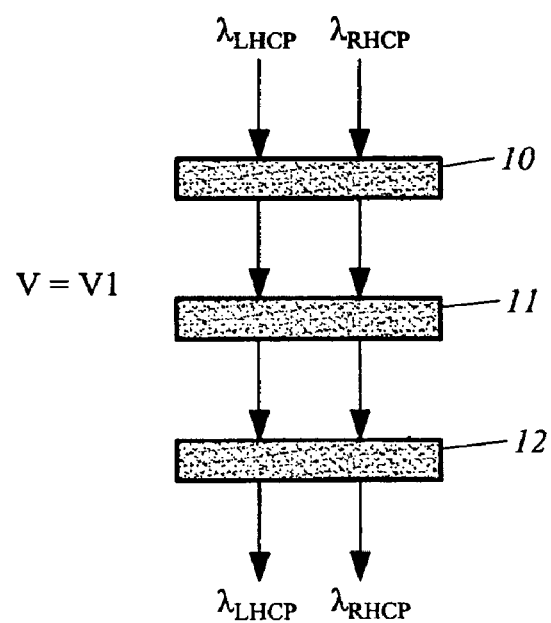
FIG. 2B illustrates the operation of the FIG. 1 cholesteric liquid crystal cell unit with another control signal.

The operation of the cholesteric liquid crystal cell unit is illustrated in FIGS. 2A and 2B in which the cells 10 and 12 and element 11 are separated to illustrate their operations. With no control signal voltage, i.e., V=0, on the cholesteric liquid crystal cells 10 and 12, the LHCP portion of the light incident upon the first cholesteric liquid crystal cell 10 is reflected and the RHCP portion is transmitted through the cell 10 to the π-phase waveplate element 11. The transmitted light is "flipped" by the waveplate element 11 to the LHCP state and is then reflected by the second cholesteric liquid crystal cell 12. The net effect is that the incident light is reflected by the cholesteric liquid crystal cell unit. If the control signal voltage is turned on, i.e., V=V1, both cholesteric liquid crystal cells 10 and 11 transmit light in both polarization states. Light incident upon the cholesteric liquid crystal cell unit is transmitted through the unit.

Figure 3:
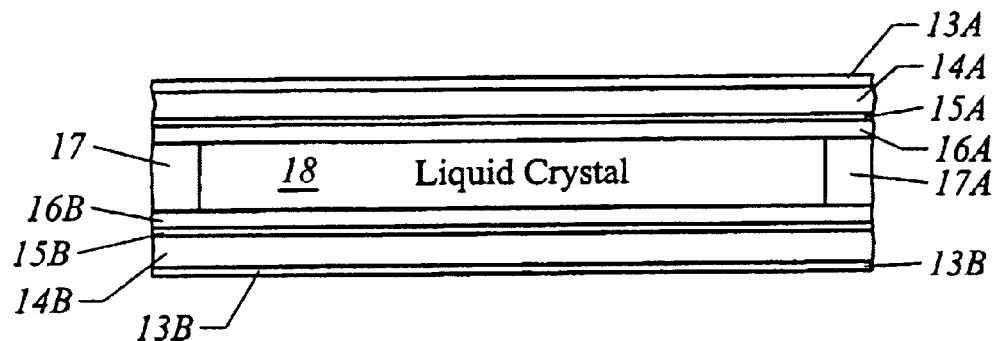
FIG. 3 illustrates the detailed structure of one embodiment of the FIG. 1 cholesteric liquid crystal cell unit.

FIG. 3 shows the detailed structure of a liquid crystal cell, including that of a cholesteric liquid crystal cell. The cell has two glass substrates 14A and 14B which each have outer coatings 13A and 13B of antireflection material respectively. On the inner surfaces of the substrates 14A and 14B are conductive layers 15A and 15B of indium-tin oxide (ITO) and on the ITO layers are respectively aligning layers 16A and 16B, such as treated polyimide layers, for example. Spacer layer 17 separates the layers 13A–16A from the layers 13B–16B to define a cavity 18 which is filled with the liquid crystal material. Material, such as thin mylar film and small diameter rods or balls, may be used for the spacer layer 17. The antireflection coatings 13A and 13B ensure that reflection is controlled by the orientation of the liquid crystal and not by the reflection off the surfaces of the substrates 14A and 14B. The ITO layers 15A and 15B receive electrical signals and act as conductive plates to create the electric fields to control the orientation of the liquid crystal and operation of the cell. The polyimide layers align the liquid crystal in the cavity 18 in the absence of an electric field.

In one embodiment of the cholesteric liquid crystal cell unit, the π-phase waveplate element 11 can be integrated into a cholesteric liquid crystal cell by placing the wavelength plate element 11 between the ITO layer 15B and substrate layer 14B of the cholesteric liquid crystal cell 10 of the unit. In this case, the element 11 is best realized as one or more birefringent coatings upon the substrate layer 14B. Alternatively, the waveplate element 11 can be placed between the substrate layer 14A and the ITO layer 15A of the second cholesteric liquid crystal cell 12 of the unit, or the waveplate element 11 itself can be substituted for the substrate layer 14B to serve two functions. The waveplate element 11 might be a quartz crystal plate about 90 µm thick for the proper phase delay for optical communication wavelengths. In any case, the π-phase waveplate element 11 is functionally between the two cholesteric liquid crystal cells as shown in the FIG. 1 arrangement.

The description above implies that both cholesteric liquid crystal cells 10 and 12 are the same, i.e., the cells 10 and 12 have either the same or different cholesteric liquid crystals with the same orientation. An alternative embodiment has two liquid crystal cells in which the cholesteric liquid crystals in the two cells have opposite orientations. For example, if the cholesteric liquid crystal in the first cell 10 reflects LHCP light (with V=0) and the cholesteric liquid crystal in the second cell 12 reflects RHCP light, a π-phase waveplate element 11 is unnecessary. The resulting unit reflects incident light when V=0 and transmits light when V=V1. A left-hand oriented cholesteric liquid crystal might be used for the first cell 10 and a right-hand oriented cholesteric liquid crystal for the second cell 12. An effective cholesteric liquid crystal material is formed by doping a nematic liquid crystal with a chiral dopant to obtain the chiral structure and corresponding chirality. The cholesteric liquid crystal cell unit has a simpler structure with the elimination of the π-phase waveplate element.

Cholesteric Liquid Crystal Cell Devices

The described cholesteric liquid crystal cell units allow the assembly of different devices useful in fiberoptic networks.

Figure 4A:
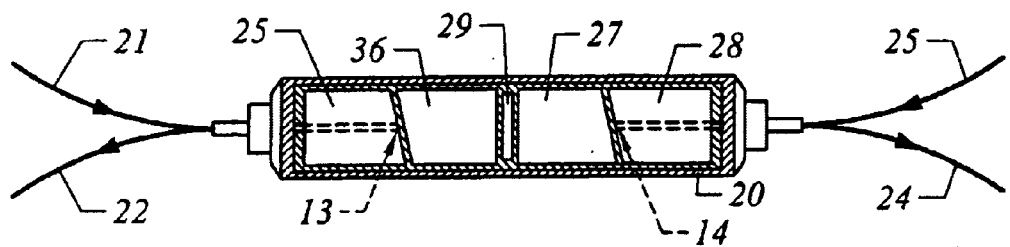
FIG. 4A is a cross-sectional side view of an optical switch device with the FIG. 1 cholesteric liquid crystal cell unit, according to an embodiment of the present invention.

An optical switch is illustrated in FIG. 4A. The structure and operation of the switch is similar to the electromechanical optical switch disclosed in U.S. Pat. No. 5,742,712, which was issued Apr. 21, 1998 to J. J. Pan et al. However, the present switch avoids the problems created by mechanical operations in the device.

Figure 4B:
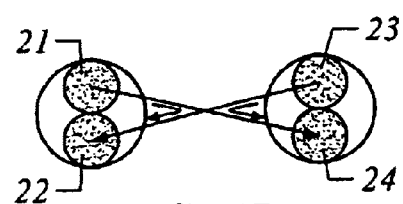
FIG. 4B is a cross-sectional end view of the end faces of the ferrules of the FIG. 4A optical switch device.

In the present switch, end sections of two optical fibers 21 and 22 are fixed into a central aperture through the longitudinal axis of a glass ferrule 25. Likewise, end sections of two more optical fibers 23 and 24 are inserted into a central aperture through the longitudinal axis of a second glass ferrule 28. The end faces 13 and 14 of the ferrules 25 and 28 respectively are slightly angled in close proximity to reciprocally angled end faces of quarter-pitch GRIN lens 26 and 27. End cross-sectional views of the end faces 13 and 14 with the fibers 21 and 22, and fibers 23 and 24 in their respective apertures are shown in FIG. 4B. Between the two GRIN lenses 26 and 27 is a cholesteric liquid crystal cell unit 29, as described above, and shown as a single element for purposes of simplicity of explanation. The end sections of the fibers 21–24 and the elements 25–29 are enclosed and protected by a housing 20.

The ferrules 25 and 28 with the fixed end sections of the optical fibers 21–24, the GRIN lenses 26 and 27, and the cholesteric liquid crystal cell unit 29 are arranged and oriented so that light entering the described switch from the optical fiber 21 (22) is either reflected back to the optical fiber 22 (21) or transmitted to the optical fiber 24 (23). Likewise, from the other side of the switch, light from the optical fiber 23 (24) is either reflected back to the optical fiber 24 (23) or transmitted to the optical fiber 22 (21), indicated by arrows in FIG. 4B. Transmission or reflection control is provided by the control signal to the cholesteric liquid crystal cell unit 29. Besides operation as switch, the disclosed device can operate as an attenuator by varying the control signal in an analog fashion between V=0 (no output) and V=V1 (full output).

Figure 5A:
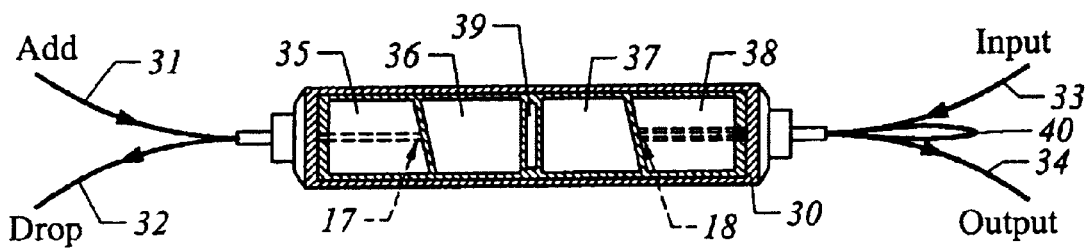
FIG. 5A is a cross-sectional view of a WDM add/drop multiplexer device according to another embodiment of the present invention.

Another device provided by the present invention is a WDM add/drop multiplexer, as illustrated in FIG. 5A. In WDM (Wavelength Division Multiplexing) and DWDM (Dense Wavelength Division Multiplexing) fiberoptic networks, optical signals are directed through the network on optical fibers according to the wavelength of the optical signals. Optical signals of a particular wavelength define a communication channel of a network which directs signals to their destinations according to their wavelengths.

Figure 5B:
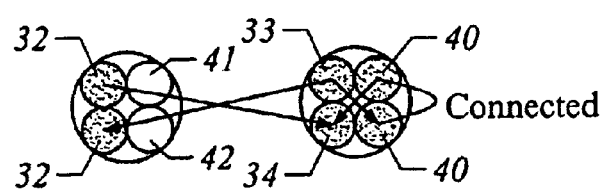
FIG. 5B is a cross-sectional end view of the end faces of the ferrules of the FIG. 5A add/drop multiplexer device.

As for the simple switch above, end sections of an add optical fiber 31 and an drop optical fiber 32, along with dummy fiber end sections 41 and 42 (not shown), are fixed into an enlarged (as compared to the apertures of the FIG. 4A switch) central aperture through the longitudinal axis of a glass ferrule 35. Likewise, end sections of an input optical fiber 33 and an output optical fiber 34 and a fiber loop 40 are inserted into a central aperture through the longitudinal axis of a second glass ferrule 38. The end faces 17 and 18 of the ferrules 35 and 38 respectively are slightly angled in close proximity to reciprocally angled end faces of quarter-pitch GRIN lens 36 and 37. End cross-sectional views of the end faces 17 and 18 with fibers 31, 32 and 41, 42, and with fibers 33, 34 and fiber 40 in their respective apertures are shown in FIG. 5B. Between the two GRIN lenses 36 and 37 is a cholesteric liquid crystal cell unit and a wavelength-dependent filter drawn as a single unit 39. The end sections of the fibers 31–34, the fiber loop 40 and remaining elements 35–39 are enclosed and protected by a housing 30.

The wavelength-dependent filter may be a high-pass, low-pass or bandpass filter depending upon its particular function and may be realized as in the form of a filter plate, or multiple dielectric coatings on the surface of another element of the WDM add/drop multiplexer. While in theory the wavelength-dependent filter might be placed on either side of the liquid crystal cell unit, practice has shown that the filter should be placed toward the GRIN lens 37.

Operationally, the WDM add/drop multiplexer is connected to a WDM network by the input and output optical fibers 33 and 34, and to a user by the add and drop optical fibers 31 and 32. The user is assigned a wavelength or a slot of wavelengths by which to communicate with the network. Depending upon the location of the user wavelength(s) with respect to the other wavelengths of the light carried by the network, the wavelength-dependent filter may be a high-pass, low-pass or bandpass filter. The filter transmits light at the user's wavelength and blocks (reflects) light at other wavelengths. With the cholesteric liquid crystal cell unit of the unit 39 in the transmission state, light at the user's wavelength can be received, or dropped, from the network. Light at that wavelength is transmitted from the input fiber 33 through the filter and cholesteric liquid crystal cell unit to the drop optical fiber 32. Light from the input fiber 33 at other wavelengths is reflected by the filter through the fiber loop 40 back to the filter again, where the light is reflected into the output fiber 34. In the opposite direction, light at that wavelength can be sent, or added, by the user to the network. Light at the user's wavelength is transmitted from the add fiber 31 through the cholesteric liquid crystal cell unit and filter 39 to the output optical fiber 34.

When the cholesteric liquid crystal cell unit is not transmitting, light from the input fiber 33 at all wavelengths is reflected by the filter and the cholesteric liquid crystal cell unit through the fiber loop 40 back to the filter 40 and liquid crystal cell unit again, where the light is reflected into the output fiber 34. In the opposite direction, light from the add fiber 31 is reflected back to the drop fiber 32. The network is isolated from the user.

It should be noted that the wavelength-dependent filter and the fiber loop 40 provide a double filtering function to better define the wavelength dropped to the user from the network when the cholesteric liquid crystal cell unit is transmitting. If double filtering is not required, a wavelength-dependent filter could be added to the optical switch of FIG. 4A. In such a case, the optical fibers 23 and 24 become the network input and output fibers and the optical fibers 21 and 22 become the user add and drop optical fibers, respectively.

Cholesteric Liquid Crystal Cell Switch Systems

Figure 6A:
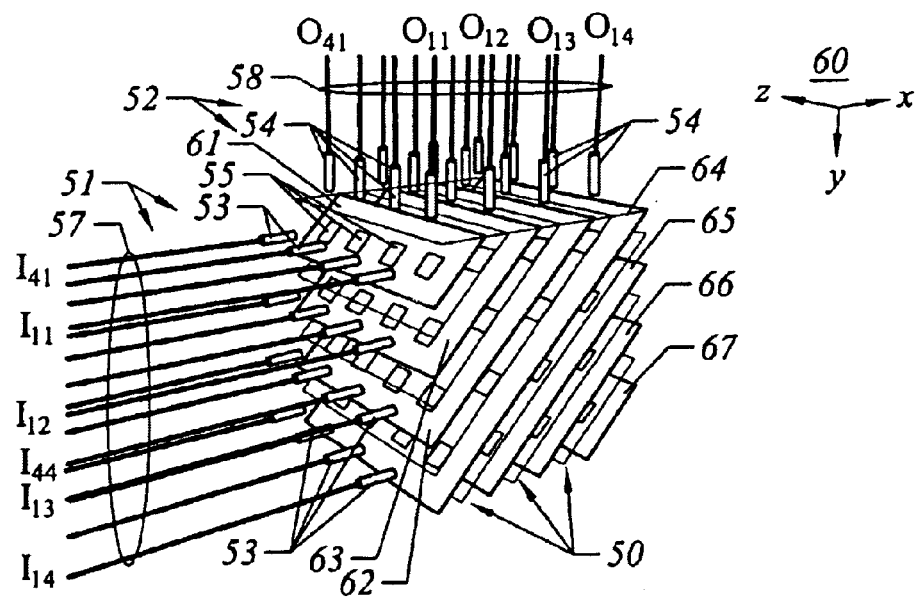
FIG. 6A is an exploded perspective view of a switch system with cholesteric liquid crystal cell units according to an embodiment of the present invention.
Figure 7A:
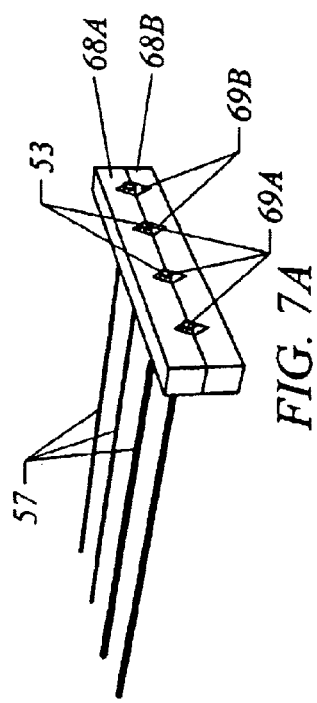
FIG. 7A is a perspective view of the arrayed end sections of the optical fibers of the FIG. 6A switch system.

In accordance with the present invention, highly compact switch systems may be constructed with the cholesteric liquid crystal cell units. FIG. 6A is an exploded perspective view of an exemplary switch system with cholesteric liquid crystal cell units according to another embodiment of the present invention. The switch system has a switching matrix 50 with cholesteric liquid crystal cell units 55, an input fiber array 51 and a reflected output fiber array 52. (A second transmitted output fiber array is not shown for simplification purposes but is shown in FIG. 7C.) The input fiber array 51 is formed by 16 input fibers 57 arranged in a 4×4 square array. At the end of each fiber 51 is fixed a collimating quarter-pitch GRIN lens 53. Likewise, the output fiber array 52 is formed by 16 output fibers 58 arranged in a 4×4 square array and at the end of each output fiber 58 is a collimating quarter-pitch GRIN lens 54. While the switch system might work with other types of optical fibers, all of the optical fibers described herein should be considered as single mode fibers for optimal operation. This description also refers to the optical fibers described above for the cholesteric liquid crystal cell devices.

The input fiber array 51 and output fiber array 52 are arranged at 90° to each other, each array facing the switching matrix 50 which has cholesteric liquid crystal cell units 55 fixed in mounting plates 61–67. Parallel plates 61–67 holds 64 cholesteric liquid crystal cell units 55 in 4×4×4 cubic array. Though shown as single plates, it should be understood that each of plates 61–67 represent a plurality of substrates, coatings and layers, as explained with respect to FIG. 3. The plates 61 and 67 hold four cell units 55 in a 1×4 linear array; plates 62 and 66 hold eight cell units 55 in a 2×4 array; plates 63 and 65 hold twelve cell units 55 in a 3×4 array; and plate 64 holds sixteen cell units 55 in a 4×4 array. The plates 61–67 are arranged so that their surfaces are at 45° to the alignment of the arrayed input optical fibers 57 and output optical fibers 58. The cholesteric liquid crystal cell units 55 are located so that any light from an input optical fiber 57 which is reflected by a unit 55 is directed to an output optical fiber 58. Joined together in the switching matrix 50, the cholesteric liquid crystal cell units 55 form four 4×4 switch arrays.

Each switch array is aligned parallel to the X-Y plane defined by the reference axes 60 and is formed in different X-Y planar cross-sections of the switching matrix of FIG. 6A switch system. Each switch array 71–74 has 16 cholesteric liquid crystal cell units 55 arranged in a 4×4 array. Each row (with reference to FIG. 6B) of cholesteric liquid crystal cell units 55 is aligned with an input optical fiber. As shown in FIG. 6A, the switch array 71 has input optical fibers $I_{11}$–$I_{14}$ and reflected output optical fibers $O_{11}$–$O_{14}$. Similarly, the switch array 72 has input optical fibers $I_{21}$–$I_{24}$ and reflected output optical fibers $O_{21}$–$O_{24}$; the switch array 73 has input optical fibers $I_{31}$–$I_{34}$ and reflected output optical fibers $O_{31}$–$O_{34}$. The switch array 74 has input optical fibers $I_{41}$–$I_{44}$ and reflected output optical fibers $O_{41}$–$O_{44}$. Most of these reference numerals are not shown in FIG. 6A to avoid unnecessarily complicating the drawing, but the inputs and reflected outputs are shown in the switch arrays 71–74 in FIG. 6B.

Figure 6B:
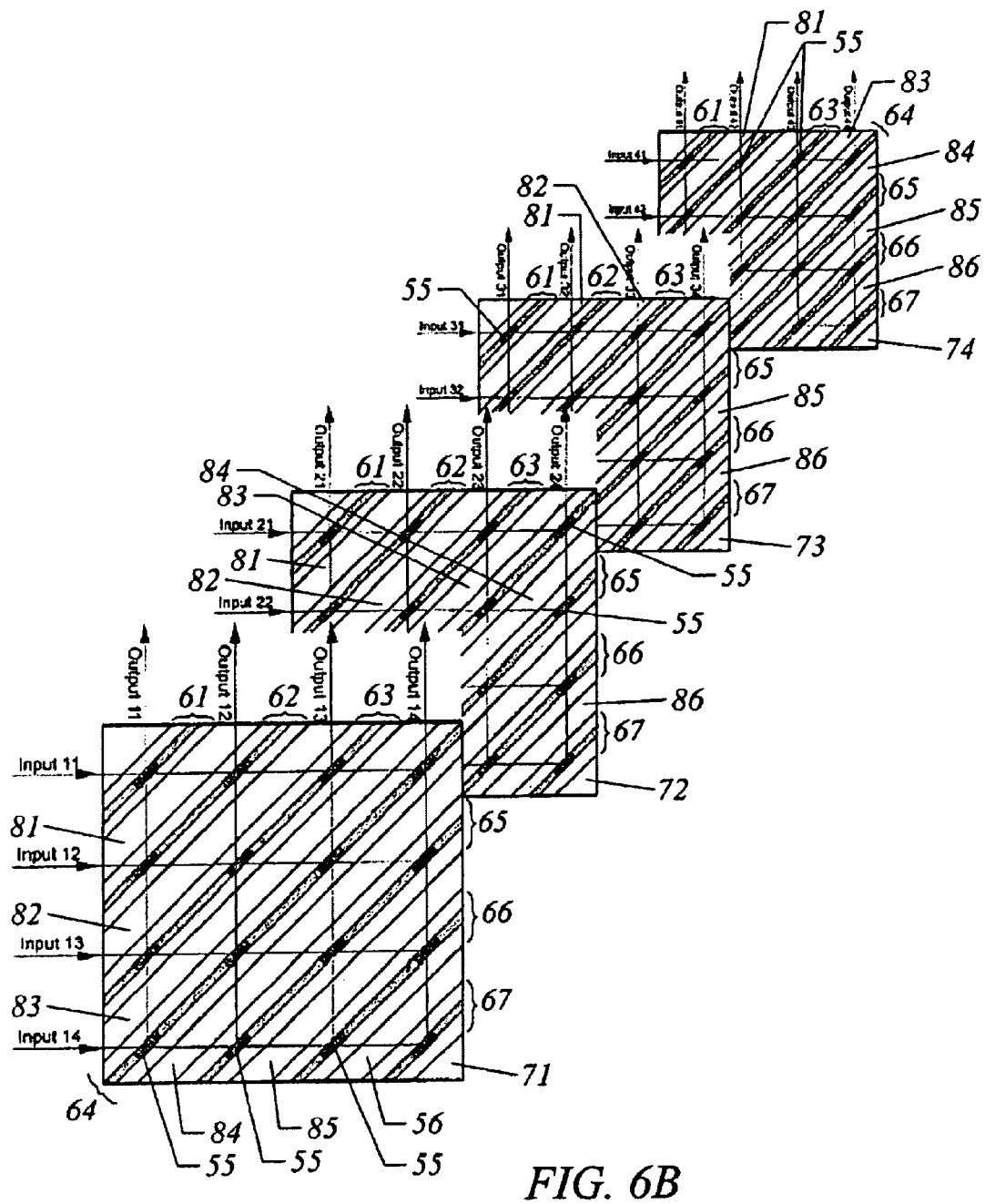
FIG. 6B is a diagram of the different cross-sections of the switching matrix of FIG. 6A switch system.

FIG. 6B also shows that each of the switch arrays 71–74 is formed by portions of the mounting plates 61–67 and the cholesteric liquid crystal cell units 55 in the plates. FIG. 6B better illustrates that the mounting plates 61–67 are constructed by a plurality of substrates, coatings, and layers which define the cholesteric liquid crystal cell units 55. The conductive ITO layers for each cholesteric liquid crystal cell are defined in each of the plates 61–67 to provide separate conductive leads for each cholesteric liquid crystal cell units 55. Attached to the conductive leads, a control unit (not shown) provides the signals to selectively turn the cholesteric liquid crystal cell units 55 in the switch matrix 50 into reflecting or transmitting states to operate the switch system. Furthermore, the mounting plates 61–67 are separated by separation plates 81–86 with the dimensions of the mounting plates 61–67 and separation plates 81–86 so that the switching matrix 50 form a cube.

The input, reflected output and transmitted output fiber arrays include mounting blocks to align the fiber end sections and GRIN lenses of the fiber arrays. As shown in FIG. 7A, mounting blocks 68A and 68B hold a linear array of optical fibers, in this example, fibers 57 from the input fiber array 51. The mounting block 68A has V-grooves 69A in the block's bottom surface and the mounting block 68B has matching V-grooves 69B in that block's top surface. When the two blocks 68A and 68B are placed together, the grooves 69A and 69B form slots 69 through the combined blocks in which the uncoated end sections of the optical fibers 57 and the attached GRIN lenses 53 are inserted. The slots 69 are dimensioned to hold the end sections of the optical fibers 57 and the attached GRIN lenses 53 snugly. It should be noted that if the mounting blocks 68A and 68B formed from crystalline material, the V-grooves may be formed with semiconductor processing technology where precise etching techniques have long been practiced.

Figure 7B:
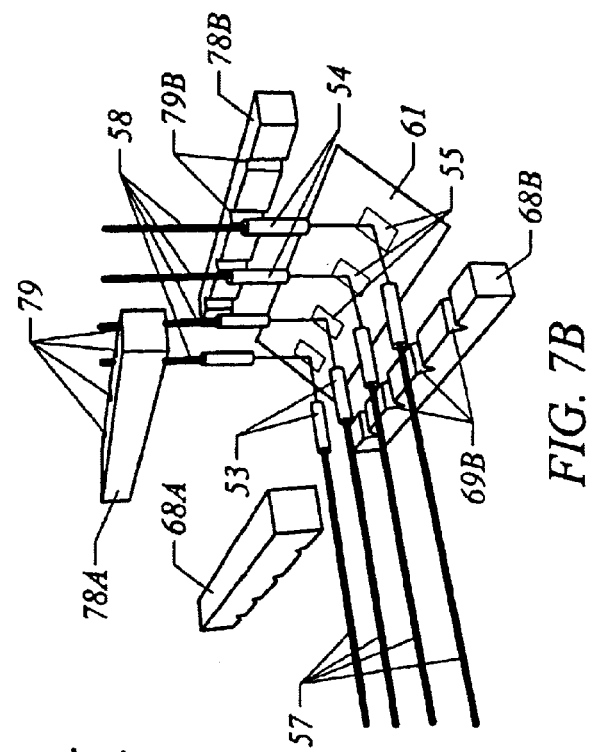
FIG. 7B is a perspective view of the arrangement of a portion of the arrayed end sections of input and output optical fibers with respect to the FIG. 6A switching matrix.
Figure 7C:
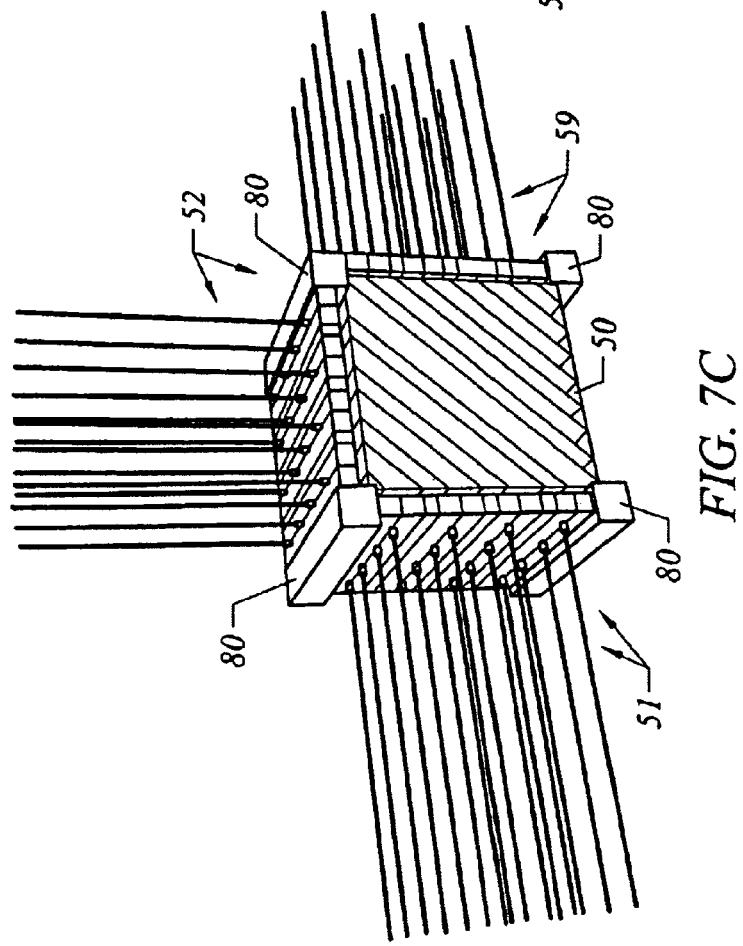
FIG. 7C is a perspective view of the FIG. 6A switch system with input, reflected output and transmitted output fiber arrays.

FIG. 7B illustrates the arrangement of a portion of the arrayed end sections of input and output optical fibers with respect to the cholesteric liquid crystal cell units 55 of the switching matrix. In this example, the FIG. 7A mounting blocks 68A and 68B with the linear array of input optical fibers 51 are shown with the mounting plate 61 with four cholesteric liquid crystal cell units 55 and mounting blocks 78A and 78B holding a linear array of optical fibers 58 from the reflected output fiber array 52. As described above, the mounting block 78A has V-grooves 79A in the block's bottom surface and the mounting block 78B has matching V-grooves 79B in that block's top surface. The resulting slots from the grooves 79A and 79B in the combined blocks hold the end sections of the optical fibers 58 and the attached GRIN lenses 54.

FIG. 7C is a perspective view of the FIG. 6A switch system with the input fiber array 51, the reflected output fiber array 52 and the transmitted output fiber array 59. Mounting blocks as described above in each of the fiber arrays 51, 52 and 59 are stacked and fixed together around the switching matrix 50 by corner blocks 80.

Figure 8A:
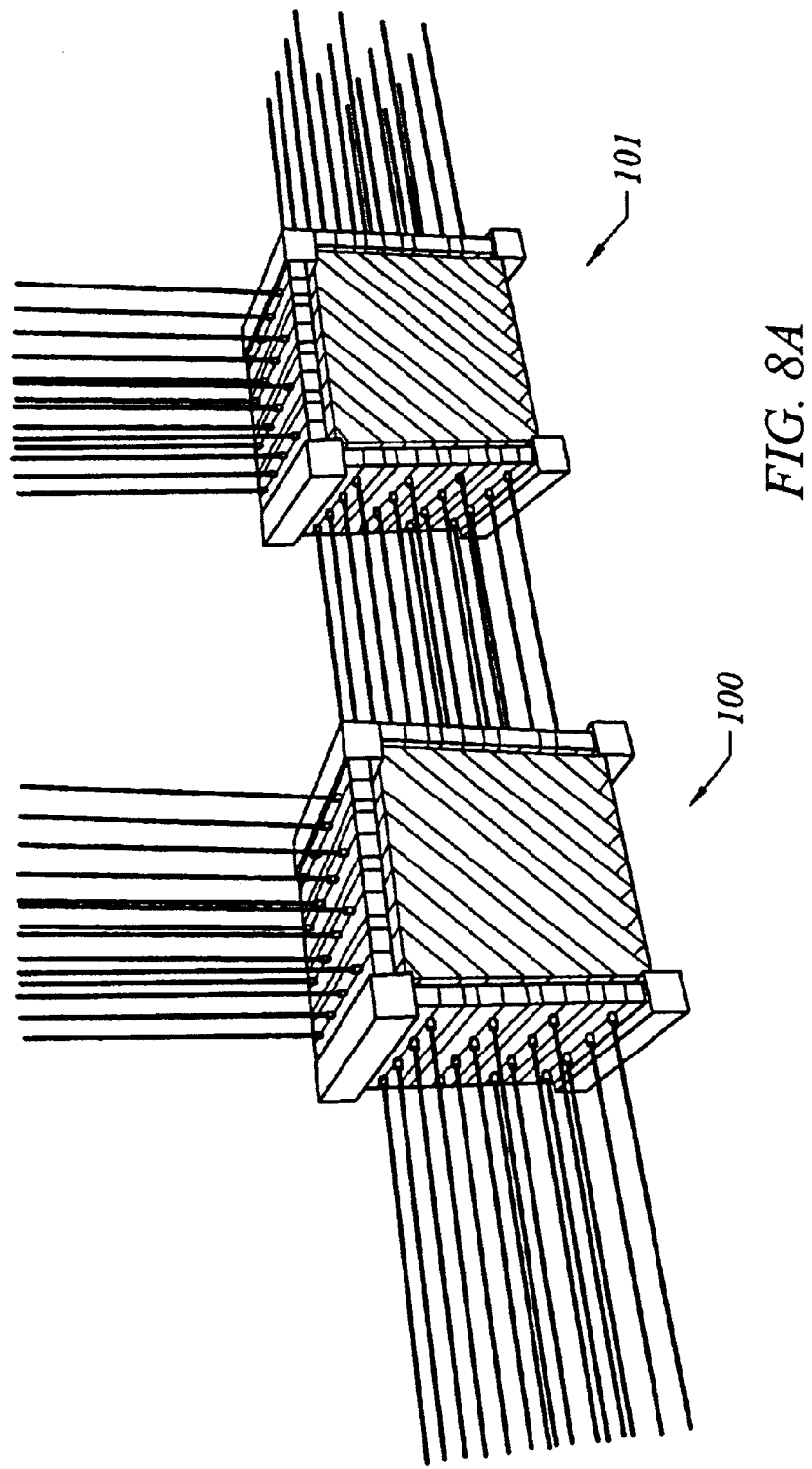
FIG. 8A illustrates the connection of two FIG. 6A switch systems to form a 4×4×4×2 switch system in accordance with an embodiment of the present invention.
Figure 8B:
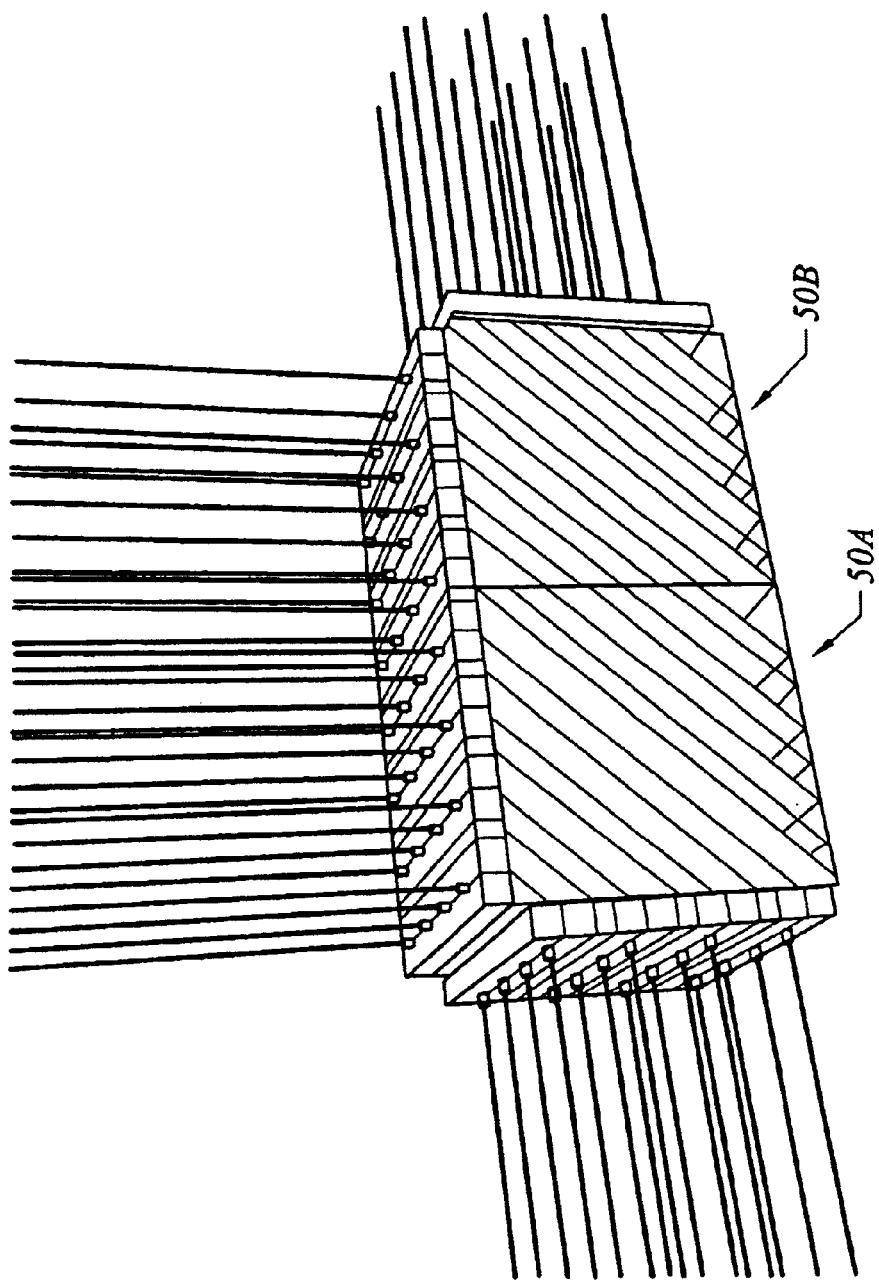
FIG. 8B shows the combination of two FIG. 6A switching matrices to form a 4×8 ×4 switch systems with the same functionality as the FIG. 8A switch systems, according to another embodiment of the present invention.

Hence the present invention provides for a switch system which is highly compact and may be expanded or reorganized in many different ways. If two 4×4×4 switch systems 100 and 101 are connected together, as illustrated in FIG. 8A, the combined switching systems operate as a 4×4×4×2 switching system. The input fiber array of the switch system 101 is connected to the transmitted output fiber array of the switch system 100. The modularity and advantages of the described switch system are evident. Alternatively, rather connecting two switch systems, two switching matrices 50A and 50B can be joined as illustrated in FIG. 8B. A 4×8×4 switching system is created. It should be noted that the switch systems described thus far are organized as four separate switch systems, either 4×4 or 4×8 (aligned side-by-side along the Z-axis of FIG. 6A). For a switch system in which the four switch systems are interconnected, the 4×4 switch systems, or the switching matrices, can be rotated 90° with each other. The present invention offers the opportunities to create switching systems of different sizes and different combinations.

Figure 9A:
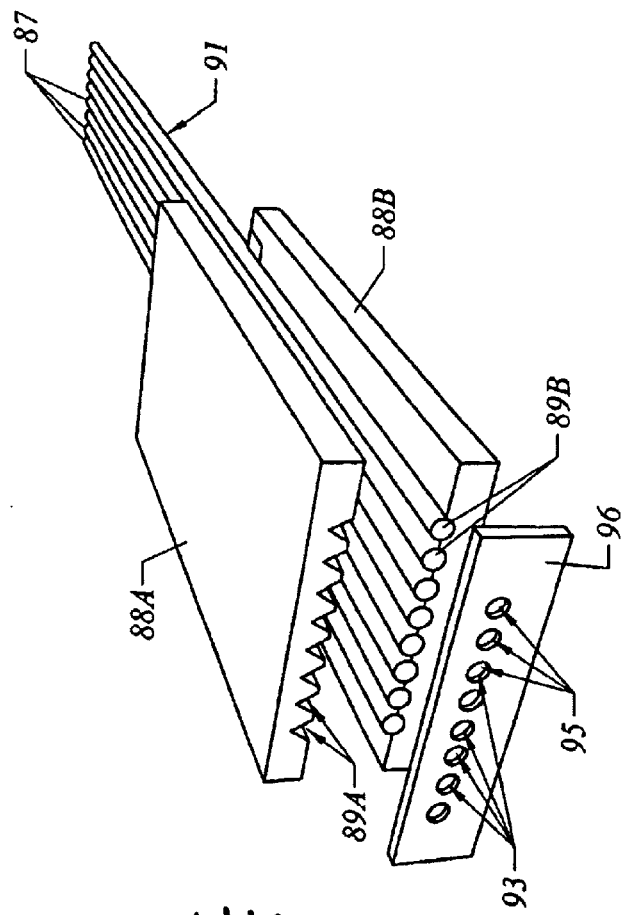
FIG. 9A is a perspective view of an assembly of the optical fibers from an exemplary optical fiber ribbon.
Figure 9B:
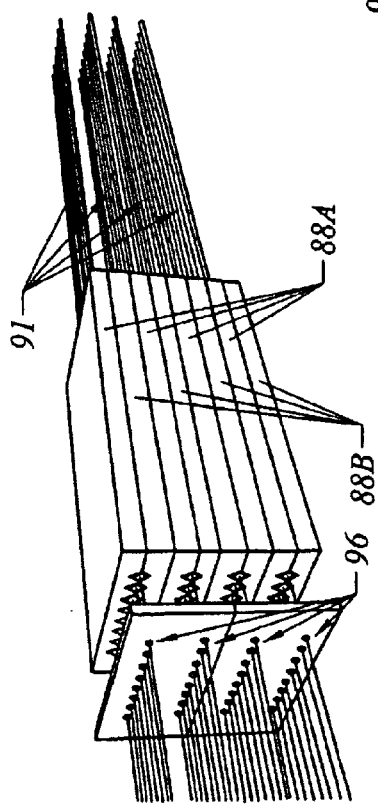
FIG. 9B is a perspective view of FIG. 9A optical fiber assemblies arranged to form an optical fiber array for a switch system in accordance with the present invention.

The optical fibers of the various fiber arrays are described previously as separate elements, but manufacturers also offer optical fibers arranged in flat ribbons by joining the protective coatings around the core and cladding of individual fibers. FIGS. 9A and 9B show how optical fiber ribbons can be incorporated into the switch systems of the present invention. An exemplary fiber ribbon 91 formed by individual fibers 87 whose uncoated end sections are placed between V-grooves 89A on the lower surface of a mounting plate 88A with and matching V-grooves 89B on the upper surface of a mounting plate 88B. The V-grooves are placed very close to each other to match the placement of the fibers 87 in the fiber ribbon 91. When fixed together, the plates 88A and 88B create a snug fit for the end sections of the optical fibers 87 whose ends are polished flush with the end surfaces of the plates 88A and 88B. To collimate (or focus) the light from the fibers 87 (or into the fibers 87), microlenses 93 are placed in front of the ends of the fibers 87 by a lens mounting plate 96 with a plurality of apertures 95, each holding a microlens 93. The lens mounting plate 96 is fixed against the ends of the mounting plates 88A and 88B with a microlens 93 in close proximity to the end of each optical fiber 87.

Figure 9C:
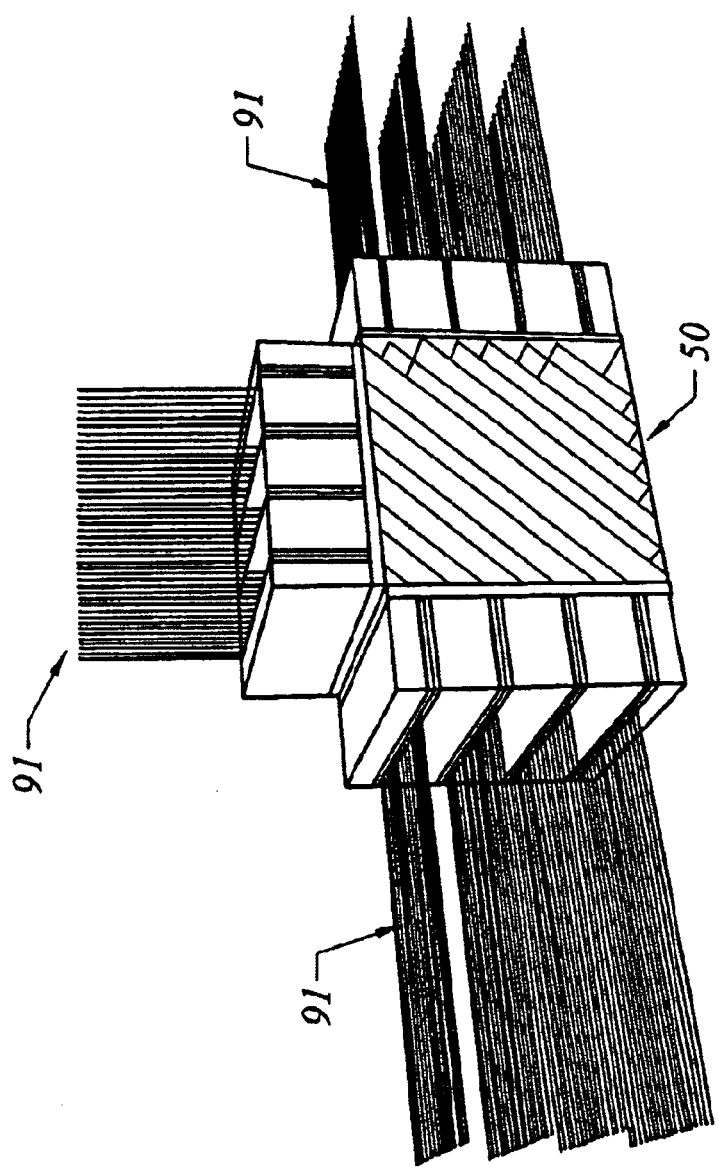
FIG. 9C is a perspective view of an exemplary switch system with the FIG. 9B optical fiber arrays.

FIG. 9B shows how the combined mounting plates 88A and 88B are themselves combined to form an optical fiber array for a switch system according to the present invention. In this example, four sets of mounting plates 88A and 88B hold four fiber ribbons 91 and four lens mounting plates 96 hold the collimating (and focusing) microlenses for the optical fibers. With optical fibers arranged in fiber ribbons, optical fiber arrays for the switch systems can be easily enlarged. In the FIG. 9B example, 32 (4×8) optical fibers are assembled into an optical fiber array; FIG. 9C illustrates a switch system with fiber ribbons creating optical fiber arrays of 64 (4×16) optical fibers. The same reference numerals are used previously; the number of optical fibers in each fiber ribbon 91 is doubled. Of course, the number of cholesteric liquid crystal cell units 55 in the switching matrix 50 is also doubled (in the Z-axis direction).

Figure 9D:
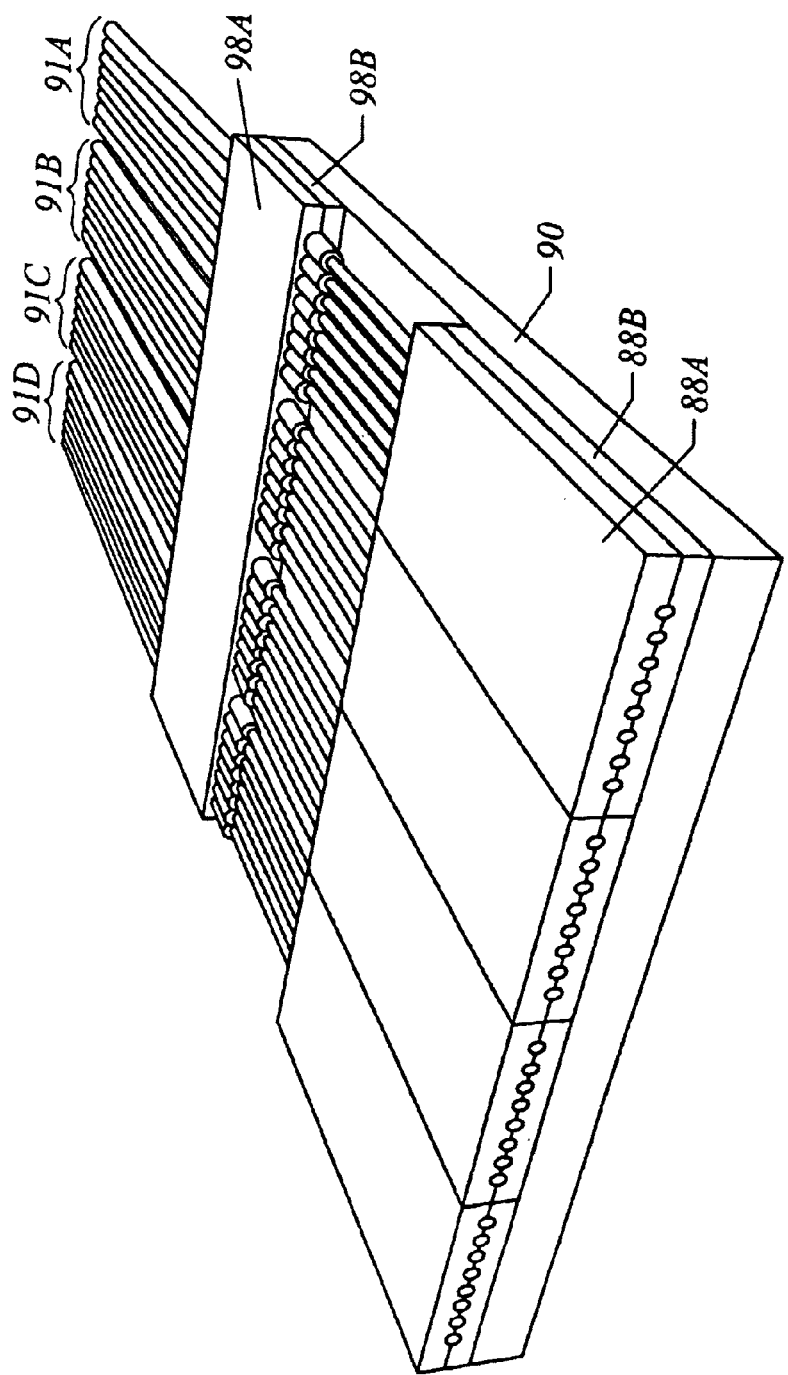
FIG. 9D is a perspective view of an enlarged assembly of optical fibers from the FIG. 9A optical fiber ribbon assembly.

Besides increasing the number of fibers in a fiber ribbon 91 as illustrated in FIG. 9C, the modular nature of the optical fiber arrays of FIGS. 9A and 9B allow the number of optical fibers to be increased in an optical fiber array easily. In this example shown in FIG. 9D, four assemblies of optical fiber ribbons 91A–91D are fixed side-by-side on a substrate 90. An upper plate 98A and lower plate 98B with matching V-grooves hold the coated portions. Besides the V-grooved mounting plates holding the uncoated end sections of the fibers described above, the coated portions of the fibers in the ribbons 91A–91D are further supported with V-grooved upper and lower plates 98A and 98B. The lower plate 98B is fixed to the substrate 90. In this manner, 32 optical fibers are arrayed linearly. If stacked with three other such arrays, an optical fiber array of 128 (32×4) optical fibers is created.

Hence the present invention offers many advantages. Reliance upon mechanical systems is avoided and the cholesteric liquid crystal cell devices and systems are highly compact. This is readily evident for the optical switch system in which the switching matrix is condensed into a three-dimensional array of cholesteric liquid crystal cell units. The switch system can be flexibly combined and integrated into many different combinations.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. An optical switch system comprising
    an array of input optical fibers;
    an array of first output optical fibers; and
    a switching matrix of cholesteric liquid crystal cell units, each liquid crystal cell unit reflecting or transmitting light selectively responsive to control signals and arranged with respect to said array of input optical fibers and said array of first output optical fibers so that light signals from an input optical fiber may be selectively reflected or transmitted by said liquid crystal cell unit into one of said first output optical fibers, wherein said array of input optical fibers and said array of first output optical fibers comprise two-dimensional arrays, and said switching matrix of cholesteric liquid crystal cell units comprises a three-dimensional array, said switching matrix of cholesteric liquid crystal cell units comprising a plurality of cholesteric liquid crystal cell unit mounting plates, each cholesteric liquid crystal cell unit mounting plate having at least a one-dimensional array of said cholesteric liquid crystal cell units and arranged at an angle with respect to said array of input optical fibers and said array of first output optical fibers.

2. The optical switch system of claim 1 further comprising in array of second output optical fibers, said array of second output optical fibers arranged with respect to said array of input optical fibers, said array of first output optical fibers and said switching matrix of cholesteric liquid crystal cell units so that light signals from an input optical fiber may be selectively transmitted or reflected by an liquid crystal cell unit into one of said second output optical fibers.

3. The optical switch system of claim 2 wherein said array of second output optical fibers comprises a two-dimensional array.

4. The optical switch system of claim 3 wherein each cholesteric liquid crystal cell unit mounting plate is arranged at an angle with respect to said array of input optical fibers, said array of first output optical fibers and said array of second output optical fibers.

5. The optical switch system of claim 4 wherein at least one of said cholesteric liquid crystal cell mounting plates has a two-dimensional array of said cholesteric liquid crystal cell units.

6. The optical switch system of claim 5 wherein said switching matrix comprises a plurality of separation plates, each separation plate separating two cholesteric liquid crystal cell unit mounting plates.

7. The optical switch system of claim 6 wherein said switching matrix comprises said cholesteric liquid crystal cell units arranged in a cube.

8. The optical switch system of claim 3 wherein each array of input optical fibers, first output optical fibers and second output optical fibers comprises a plurality of collimating GRIN lenses, each GRIN lens proximate ends of said input optical fibers, first output optical fibers and second output optical fibers.

9. The optical switch system of claim 3 wherein each array of input optical fibers, first output optical fibers and second output optical fibers comprises a plurality of collimating microlenses, each microlens proximate ends of said input optical fibers, first output optical fibers and second output optical fibers.

10. The optical switch system of claim 3 wherein each array of input optical fibers, first output optical fibers and second output optical fibers comprises
 a first plate having a surface with a plurality of V-grooves therein; and
 a second plate having a surface with a plurality of V-grooves therein, said second plate V-grooves matching said first plate V-grooves;
 said first and second plates fixed together so that said V-grooves form channels holding a linear array of optical fibers.

11. The optical switch system of claim 10 further comprising a plurality of said first and second plates fixed together and arranged in a stack to form a two-dimensional array of optical fibers.

12. The optical switch system of claim 1 wherein each cholesteric liquid crystal cell unit comprises
 a first cholesteric liquid crystal cell arranged to receive incident light from an input optical fiber, said first cholesteric liquid crystal cell selectively reflecting circularly polarized light of one state of said incident light or transmitting said incident light responsive to a control signal; and
 a second cholesteric liquid crystal cell arranged with respect to said first cholesteric liquid crystal cell to receive light transmitted by said first cholesteric liquid crystal cell, said second cholesteric liquid crystal cell selected to reflect or transmit light from said first cholesteric liquid crystal cell responsive to said control signal when said first cholesteric liquid crystal cell reflects said circularly polarized light of said one state or transmits said incident light respectively.

13. The optical switch system of claim 12 further comprising a π-phase waveplate element between said first and second cholesteric liquid crystal cell.

14. The optical switch system of claim 13 wherein said π-phase waveplate element comprises a third liquid crystal cell.

15. The optical switch system of claim 13 wherein said π-phase waveplate element comprises a plate of birefringent crystal.

16. The optical switch system of claim 12 wherein said first cholesteric liquid crystal cell comprises a first cholesteric liquid crystal reflecting circularly polarized light in said one state, and said second cholesteric liquid crystal cell comprises a second cholesteric liquid crystal reflecting circularly polarized light in an opposite state.

17. The optical switch system of claim 1 wherein at least one of said cholesteric liquid crystal cell mounting plates has a two-dimensional array of said cholesteric liquid crystal cell units.

18. The optical switch system of claim 17 wherein said switching matrix comprises a plurality of separation plates, each separation plate separating two cholesteric liquid crystal cell unit mounting plates.

19. The optical switch system of claim 18 wherein said switching matrix comprises said cholesteric liquid crystal cell units arranged in a cube.

20. The optical switch system of claim 1 wherein each array of input optical fibers and first output optical fibers comprises a plurality of collimating GRIN lenses, each GRIN lens proximate ends of said input optical fibers and first output optical fibers.

21. The optical switch system of claim 1 wherein each array of input optical fibers and first output optical fibers comprises a plurality of collimating microlenses, each microlens proximate ends of said input optical fibers and first output optical fibers.

22. The optical switch system of claim 1 wherein each array of input optical fibers and first output optical fibers comprises
 a first plate having a surface with a plurality of V-grooves therein; and
 a second plate having a surface with a plurality of V-grooves therein, said second plate V-grooves matching said first plate V-grooves;
 said first and second plates fixed together so that said, V-grooves form channels holding a linear array of optical fibers.

23. The optical switch system of claim 22 further comprising a plurality of said first and second plates fixed together and arranged in a stack to form a two-dimensional array of optical fibers.

* * * * *